US006401181B1

United States Patent
Franaszek et al.

(10) Patent No.: US 6,401,181 B1
(45) Date of Patent: Jun. 4, 2002

(54) DYNAMIC ALLOCATION OF PHYSICAL MEMORY SPACE

(75) Inventors: Peter A. Franaszek, Mt. Kisco; Michel Hack, Courtlandt Manor, both of NY (US); Charles O. Schulz, Ridgefield; T. Basil Smith, III, Wilton, both of CT (US); R. Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 09/627,516

(22) Filed: Jul. 28, 2000

Related U.S. Application Data
(60) Provisional application No. 60/185,736, filed on Feb. 29, 2000.

(51) Int. Cl.⁷ .................................................. G06F 12/02
(52) U.S. Cl. ........................ 711/170; 711/173; 711/172; 711/171; 707/205
(58) Field of Search ................................. 707/200, 205, 707/206; 709/104, 105; 711/6, 133, 135, 129, 153, 170, 171, 172, 173

(56) References Cited

U.S. PATENT DOCUMENTS

| | | | |
|---|---|---|---|
| 4,121,286 A | * 10/1978 | Venton et al. | 707/206 |
| 5,491,808 A | * 2/1996 | Geist. Jr. | 707/205 |
| 5,761,536 A | 6/1998 | Franaszek | |
| 5,802,341 A | * 9/1998 | Kline et al. | 711/209 |
| 5,864,859 A | 1/1999 | Franaszek | 707/101 |
| 5,991,775 A | * 11/1999 | Beardsley et al. | 707/205 |
| 6,247,105 B1 | * 6/2001 | Goldstein et al. | 711/170 |

OTHER PUBLICATIONS

"Research Report—Design Analysis of Internal Organizations for Compressed Random Access Memories", by Peter A. Franaszek, et al., Computer Science/Mathematics, IBM Research Report RC 21146 (94535), Oct. 28, 1998, pp. 1–30.

* cited by examiner

*Primary Examiner*—B. James Peikari
(74) *Attorney, Agent, or Firm*—Scully, Scott, Murphy & Presser; Robert P. Tassinari, Esq.

(57) ABSTRACT

In a computer system, a system and methodology for dynamically allocating available physical memory to addressable memory space on an as needed basis, and to recover unused physical memory space when it is no longer needed. Physical memory is assigned to addressable memory space when that memory space is first written. When the system software determines it has no further need of a memory space, the physical memory is recovered and made available for reuse.

26 Claims, 10 Drawing Sheets

DYNAMIC ALLOCATION OF PHYSICAL MEMORY SPACE

This application claims the benefit of U.S. Provisional Application No. 60/185,736, filed Feb. 29, 2000.

BACKGROUND OF THE INVENTION

1. Field of the Invention

This invention relates generally to the field memory usage and organization in computer systems, and more specifically to a dynamic physical memory allocation and memory recovery system.

2. Discussion of the Prior Art

In computer systems it is customary that there be one-to-one correspondence between the memory address produced by the processor and a specific area in the physical memory of the system. It is an error for the processor to request access to an address which does not have an associated physical memory area. This limits the operating system and applications to an address space determined by the actual physical memory installed in the system. Modern computer systems have overcome this limitation through the use of virtual memory which implements a translation table (TT) to map program addresses to real memory addresses.

With virtual memory the program works in an address space limited only by the processor architecture. It is a function of the operating system to ensure that the data and code a program is currently using is in main memory and that the translation table can map the virtual address to the real address correctly. In a virtual memory system the allocation of memory is most commonly performed by the operating system software. This requires an interrupt of the instruction sequence so that the privileged kernel code can allocate physical memory to the area being accessed so that normal program flow can continue without error. This interrupt and the kernel processing to allocate physical memory requires a significant amount of processing time and upsets the normal pipelining of instructions through the CPU.

There currently exist schemes for reducing operating system process interruptions. For instance, the reference entitled "Design and Analysis of Internal Organizations for Compressed Random Access Memories" by Peter A. Franaszek and John T. Robinson, IBM Research Report RC21146(94535), dated Oct. 28, 1998, describes a low level main memory design for storing compressed data that includes a directory portion and a collection of fixed size blocks which are used to store lines in compressed format. In the memory storage scheme described herein, highly compressible lines may be stored entirely within a directory entry; otherwise, the directory entry points to one or more of the fixed size blocks which are used to store the line in compressed format. The system further makes use of page tables which translate virtual addresses to real addresses which correspond to the location in the directory of the directory entry for the line and which includes information pertaining to blocks holding a compressed line. Specifically, the information in a directory entry includes flags, fragment combining information, and, assuming fixed size entry structure pointers to one or more fixed size blocks. On a cache miss, the memory controller and decompression hardware finds the blocks allocated to store the compressed line and dynamically decompresses the line to handle the miss. Similarly, when a new or modified line is stored, the blocks currently allocated to the line are made free (if the line currently resides in the RAM), the line is compressed, and then stored in the RAM by allocating the required number of blocks.

Furthermore, U.S. Pat. No. 5,761,536 is directed to a memory organization technique utilizing a compression control device for storing variable length objects (compressed memory) in fixed-size storage blocks by enabling fixed size storage blocks to receive remaining portions (leftover compressed memory pieces or fragments) of variable length objects that take up less than a full fixed-size storage block. The system thus reduces memory fragmentation.

U.S. Pat. No. 5,864,859 is directed to a compression store addressing technique for storing variable length objects (compressed lines, each representing, e.g., ¼ of a page) in fixed size blocks so that accessing an individual line may be accomplished quickly and with little change to existing software. In particular, the beginning of any line within a page may be accessed with a single pointer plus an offset. Associated with the compression store is a list of free or available blocks (free list) which is accessed for enabling variable length object storage.

Notwithstanding the foregoing prior art systems, it would be highly desirable to provide a mechanism that enables the physical memory to be dynamically allocated in a manner such that the interruption in program flow is eliminated.

Furthermore, as a common task of memory managers such as those found in modern operating systems is to control pools of memory so that the various processes and users share the system resources fairly, it would be highly desirable to provide a mechanism for facilitating the management of these memory pools.

SUMMARY OF THE INVENTION

It is an object of the invention to provide a mechanism that enables computer system physical memory to be dynamically allocated in a manner such that the interruption in program flow can be eliminated.

It is another object of the invention to provide a mechanism under the control of hardware memory controller circuitry that enables computer system physical memory to be dynamically allocated without computer operating system execution time overhead.

It is a further object of the present invention to provide an indexing and dynamic memory allocation mechanism in the main memory addressing path, that exploits the spatial efficiencies of computer main memory indexing schemes to enable operating system and applications to be provided with real memory address spaces larger than the installed physical memory resources.

It is yet another object of the invention to provide in a system that enables computer system physical memory to be dynamically allocated, a mechanism for facilitating the management of these memory pools by grouping real memory pages into classes.

Thus, according to the principles of the invention, there is provided, a computing system implementing a processor device for generating real addresses associated with memory locations of an associated physical memory during memory read and write operations, the system comprising: a plurality of memory blocks in the physical memory storage for storing data, each memory block partitioned into one or more contiguous sectors; an index table structure in the physical memory having entries for associating a real address with a memory block of the physical memory, the table accessed for storing data in one or more allocated sectors for memory read and write operations initiated by the processor; and, a control device associated with the physical memory for dynamically allocating sectors for an associated memory block in an index table entry, and further calculating an offset of the real address in the memory block for indexing into an allocated sector of the memory block for a read and write operation. In this manner, processor memory read and write operations are expedited without external system interruption.

Such a method and apparatus of the invention may be implemented in the design of the compressed memory management systems for server devices, PCs and the like, implementing compression/decompression algorithms.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
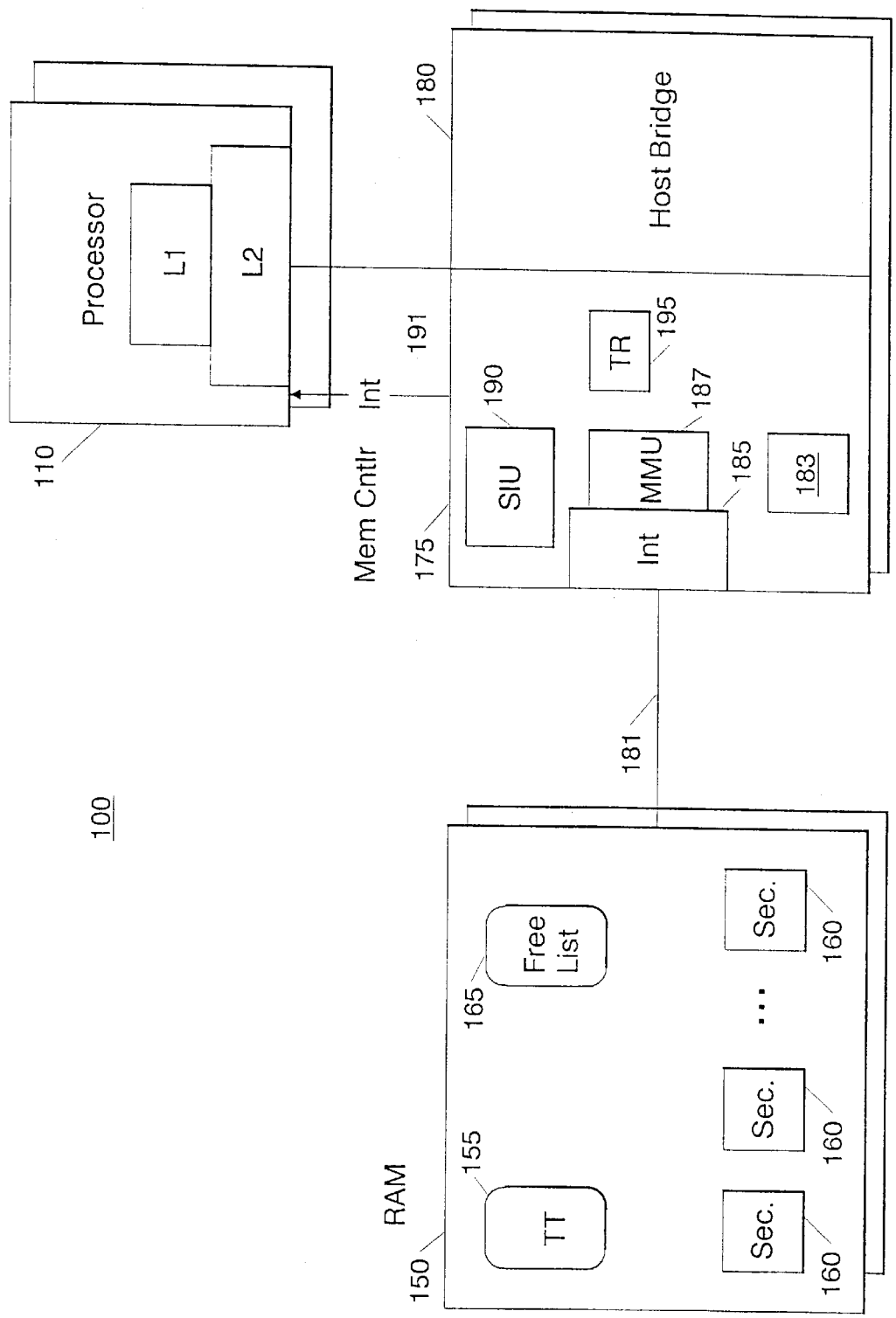
FIG. 1 depicts generally the data processing system 100 with to facilities for dynamic management of physical memory according to the invention.

FIG. 1 depicts generally a data processing system 100 with facilities for dynamic management of physical memory. Specifically, in the system of FIG. 1, there is provided at least one central processing unit (CPU) 110 which reads and stores data to real address locations in a real memory system 150. Additionally, interfaced between the CPU and the real memory system is a memory controller device 175 and host bridge 180 operating in conjunction to present real memory images to the CPU, and managing the allocation and manipulation of the physical memory.

According to the invention, the physical memory 150 includes Random Access Memory (RAM/DRAM) which includes various data structures for managing dynamically allocated physical memory and the data which the CPU reads and writes. These data structures in the RAM include: 1) a mapping table 155 such as a Translation Table (TT) which includes entries comprising pointers to a plurality of sectors 160 where the data is stored in the RAM (i.e., provides a mapping from a CPU generated real memory address to the physical address where the associated data is stored); and, 2) a Free List structure 165 which comprises a list of all of the available, unused, sectors in the physical memory. The plurality of fixed blocks of physical memory (hereinafter "sectors") comprise all of the physical memory, except the areas required for the TT 155 and the Free List 165.

The RAM 150 is managed by the Memory Controller 175 to carry out the read and store requests from the CPU and any I/O operations via the Host Bridge 180. The Memory Controller 175 includes an interface 185 to the RAM which provides the addressing and controlling signals 181 to the DRAM memory. The interface 185 operates in conjunction with a Memory Management Unit (MMU) 187 that accepts read and store requests from the CPU 110 and the Host Bridge 180 with associated read addresses. The MMU comprises registers and associated logic (SIU) 190 for maintaining a count of the number of sectors in DRAM which have been assigned to real addresses (i.e., sectors in use). The MMU additionally includes one or more threshold registers (TR) 195 and comparison logic for continuously comparing the count maintained in the SIU with the TR. When the count maintained by the SIU becomes greater than one or more of the TR(s), an interrupt signal 191 is presented to the CPU 110. Preferably, both the TR(s) and the SIU may be read by the CPU software, however, only the TR(s) may be written by the CPU.

Figure 7:
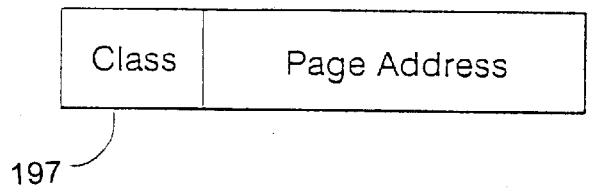
FIG. 7 depicts the format for the Class Control Register (CCR) rug which may be written with a page address and the class which is to be assigned to the page.
Figure 9:
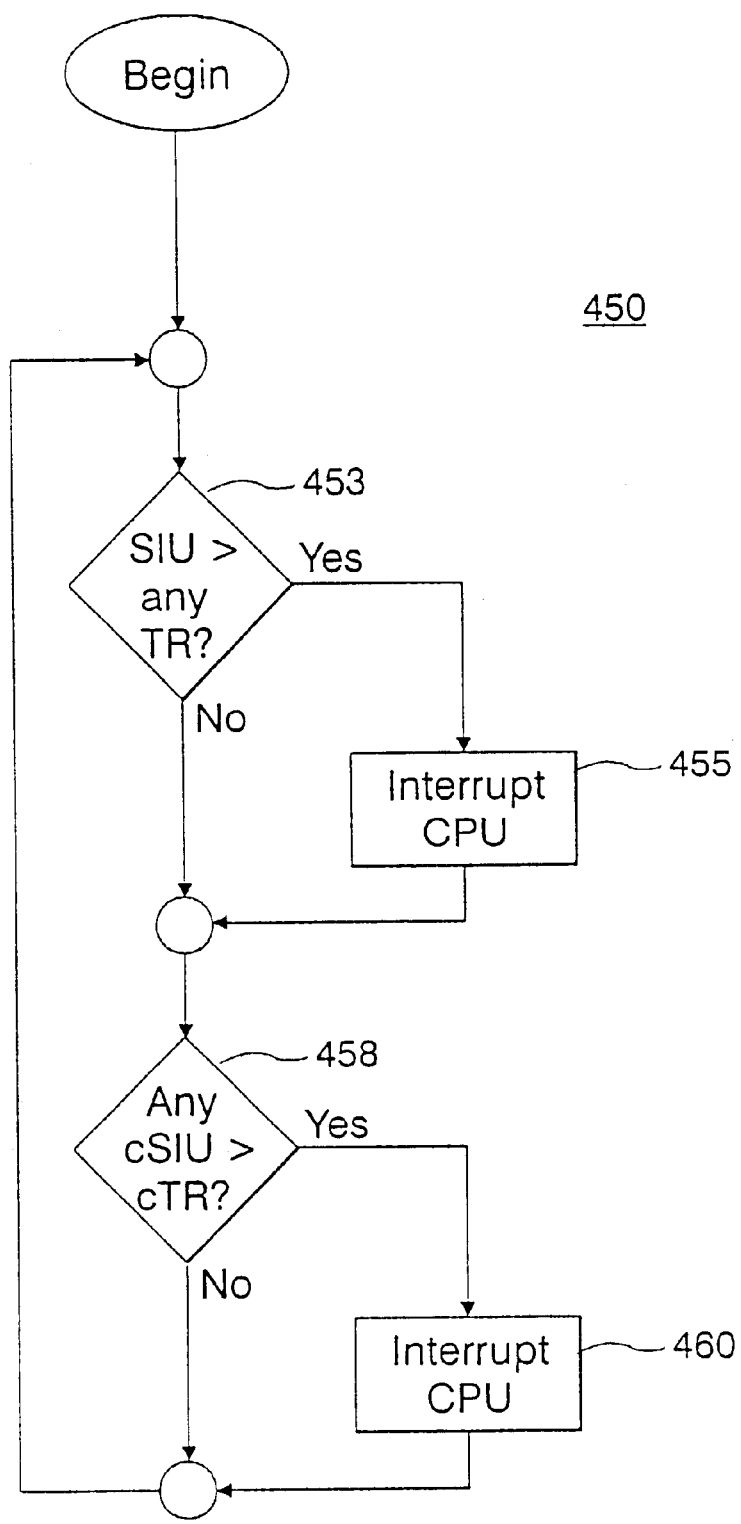
FIG. 9 is a flow chart depicting the continuous running SIU and cSIU monitoring process 450.

A common task of memory managers such as those found in modern operating systems is to control pools of memory so that the various processes and users share the system resources fairly. To facilitate the management of these memory pools, real memory pages may be grouped into classes and the physical memory usage of each of these classes monitored and managed by the dynamic memory system. To facilitate this classing, each page is provided with a tag which associates it with one of the classes. A typical system may have sixteen (16) classes. For each class, a "Class Sectors In Use" (cSIU) register 192 is provided which always maintains the current count of the sectors that are allocated to pages in that class. In addition to the cSIU registers, there is associated with each cSIU one or more "Class Threshold Registers" (cTR) 195 which may be read and written by the CPU. As depicted in FIG. 9, these cTR's are continuously compared with its associated cSIU 192. If the cSIU is found to have a count larger than the cTR value, the memory controller 175 will alert the management software by interrupting the processor. Associated with the memory classes, there is further provided a mechanism which permits software to control which real memory pages are associated with a given memory class. For example, in the memory controller, a "Class Control Register" (CCR) 197 is provided which may be written with page address and the class which is to be assigned to the page in the manner as depicted in FIG. 7. According to the invention, the real memory visible to the CPU and the I/O comprises a set of equal sized blocks of addressable words. For convenience, the size of these blocks is chosen to be an integral power of two (2) of the minimum addressable unit in the memory (byte). For the preferred embodiment, the block size is chosen to be 1024 bytes, with each real address comprising a memory of exactly one of these real memory blocks. The TT has exactly one entry for each block of real memory and is organized in a regular fashion such that a simple hash of the read address will index in the TT to the associated entry. Such a simple hash may comprise the use of higher order bits as the index. Referring back to FIG. 1, an area of the physical memory 150 is set aside for the TT 155, the size of which is dependent on the size of the real memory presented to the CPU. In the preferred embodiment, each TT entry is 16 bytes and is associated with a 1024 byte block of real memory. Thus, in this case, the TT would be equal to $16/1024=1/64$ the size of the real memory presented to the CPU 110.

Figure 2:
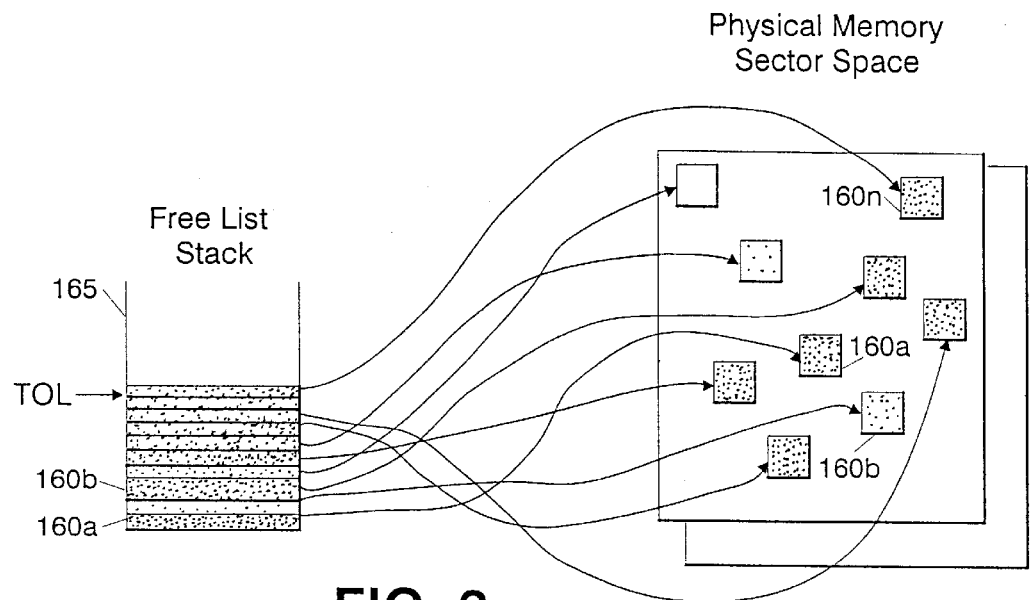
FIG. 2 illustrates the free list structure comprising a stack of pointers, according to the invention.
Figure 3:
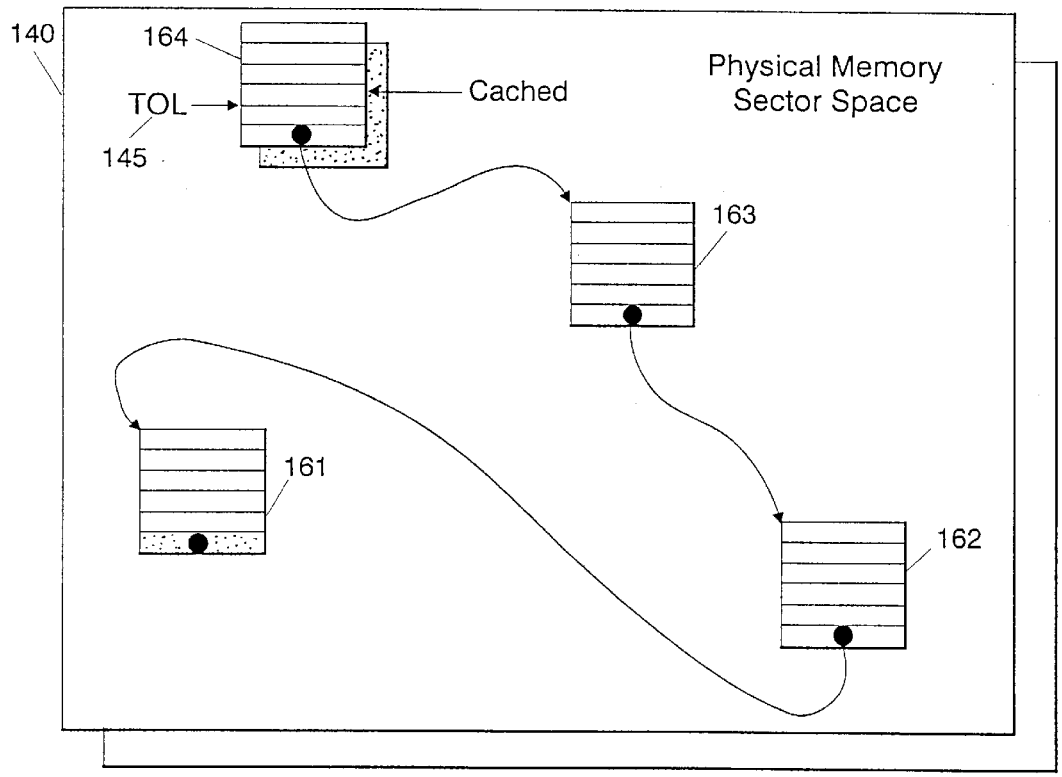
FIG. 3 depicts a free list structure comprising a linked list of free sectors, according to the invention.

With more particularity, the Free List structure 165 comprises a list of pointers to all of the physical memory sectors which are not currently assigned to a real memory block, i.e., an unused en physical memory referred to as "free space." FIG. 2 illustrates the free list structure 165 as comprising a stack of pointers 160a, . . . ,160n pointing to corresponding sectors in the free space which stack expands and shrinks during system operation as sectors are assigned to blocks or recovered from blocks. That is, the stack grows deeper as sectors are added to the free space and shallower as free sectors are allocated to real memory blocks. In the preferred embodiment the free list comprises a linked list 140 of free sectors such as illustrated in FIG. 3. The example linked list structure 140 depicted in FIG. 3 illustrates three full sectors 161, . . . ,163 of pointers to free sectors and one partial sector 164 of pointers to free sectors. The Top Of List (TOL) pointer 145 points to the top most entry on the free list. This is the first entry used when fulfilling an assignment of sectors to a real memory block. These sectors 161, . . . , 164 are themselves members of the free list so that when they have been emptied of pointers they can also be used by real memory blocks. When a new sector is required for holding pointers to free sectors it is simply allocated from the free list and linked into the chain.

In the preferred implementation, as depicted in FIGS. 1 and 3, the last sector of the free list holding pointers to unallocated sectors in memory is temporarily stored in a free list cache 183 in the memory controller 175. As shown in FIG. 3, the sector stored in the free list cache 183 includes a first or top most entry of the free list (e.g., corresponding to a most recent de-allocated sector that has been added to the list). As herein referred, a pointer to this top most entry is the top of the list (TOL) pointer. When sectors are allocated to real memory blocks they are taken out of this cache. Likewise, when the cache is depleted, it is reloaded from the next sector in the linked list.

Figure 4A:
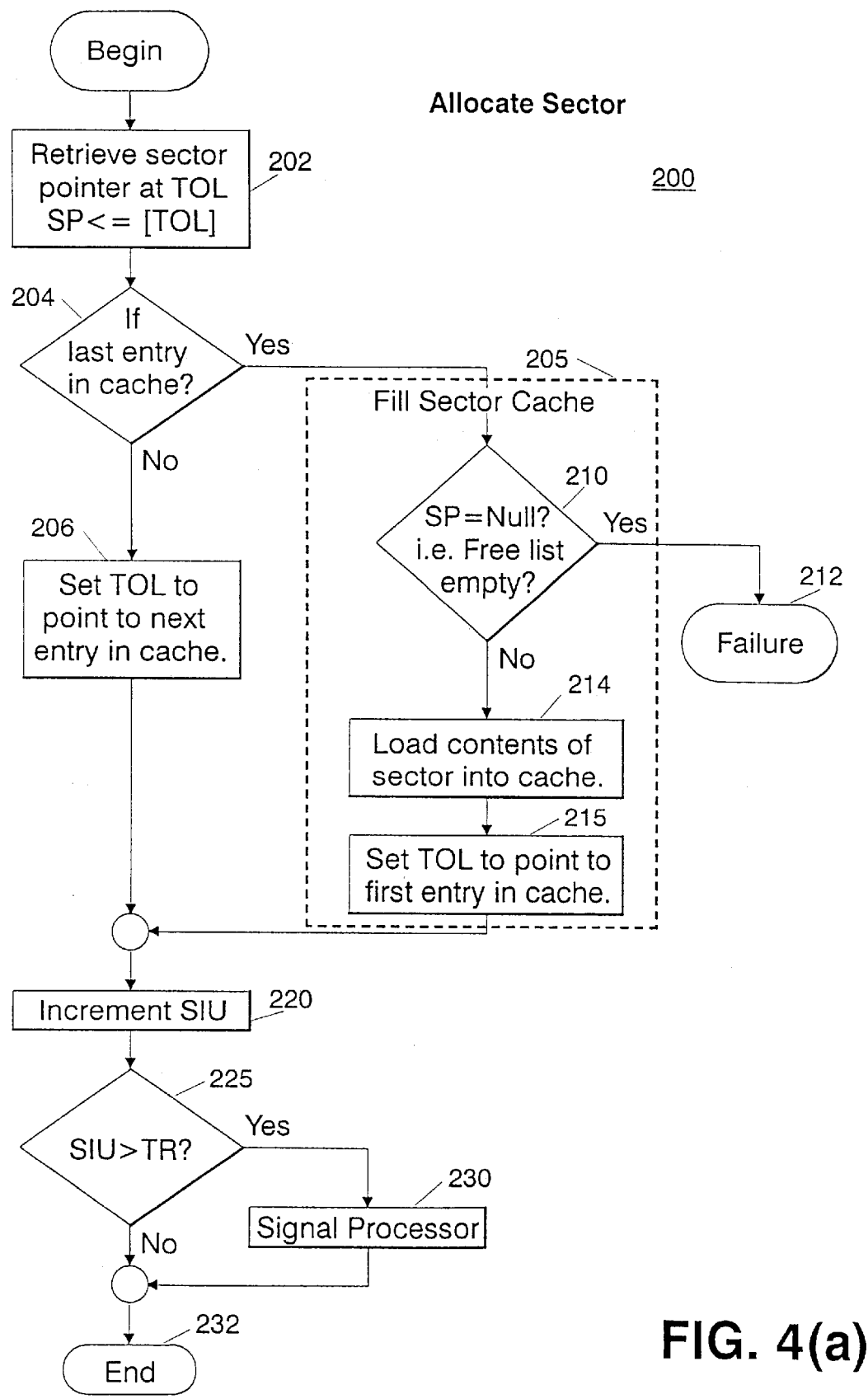
FIG. 4(a) illustrates a free sector allocation process 200.

The sector allocation process 200 is illustrated in FIG. 4(a) which depicts, at a first step 202, the retrieval of a sector pointer (SP) corresponding to the sector address that the TOL entry is pointing to. A comparison is then made at step 204 as to whether the retrieved TOL is the last entry in the cache. If the current TOL is not the last entry in the cache then, at step 206, the TOL is set to the point to the next entry in the cache, and the SIU register 190 is incremented according to the amount of sectors that were allocated at step 220. Otherwise at step 204, if the retrieved TOL was the last entry in the cache, then a mechanism 205 is implemented for filling the sector cache. This mechanism comprises a first step 210 for determining whether the sector pointer SP is of a value null which would indicate that the free list is empty, i.e., no more sectors may be allocated. If at step 210 the free list is determined as empty, then a failure is indicated at step 212. Otherwise, at step 210, if the SP does not equal a null value, then the contents of the next sector is loaded into the cache at step 214 and the TOL is then set to the first, i.e., top most, entry in the cache at step 215. Then the process proceeds to step 220 where the SIU register 190 is incremented accordingly. Continuing on, at step 225, a decision is made as to whether the value stored in the SIU (number of sectors in use) is greater than the threshold value stored in the TR register. If the SIU value is greater than the threshold value stored in the TR register, then, at step 230, the MMU generates an interrupt signal to the processor and terminates at step 232. Otherwise, the sector allocation process ends at step 232.

Figure 4B:
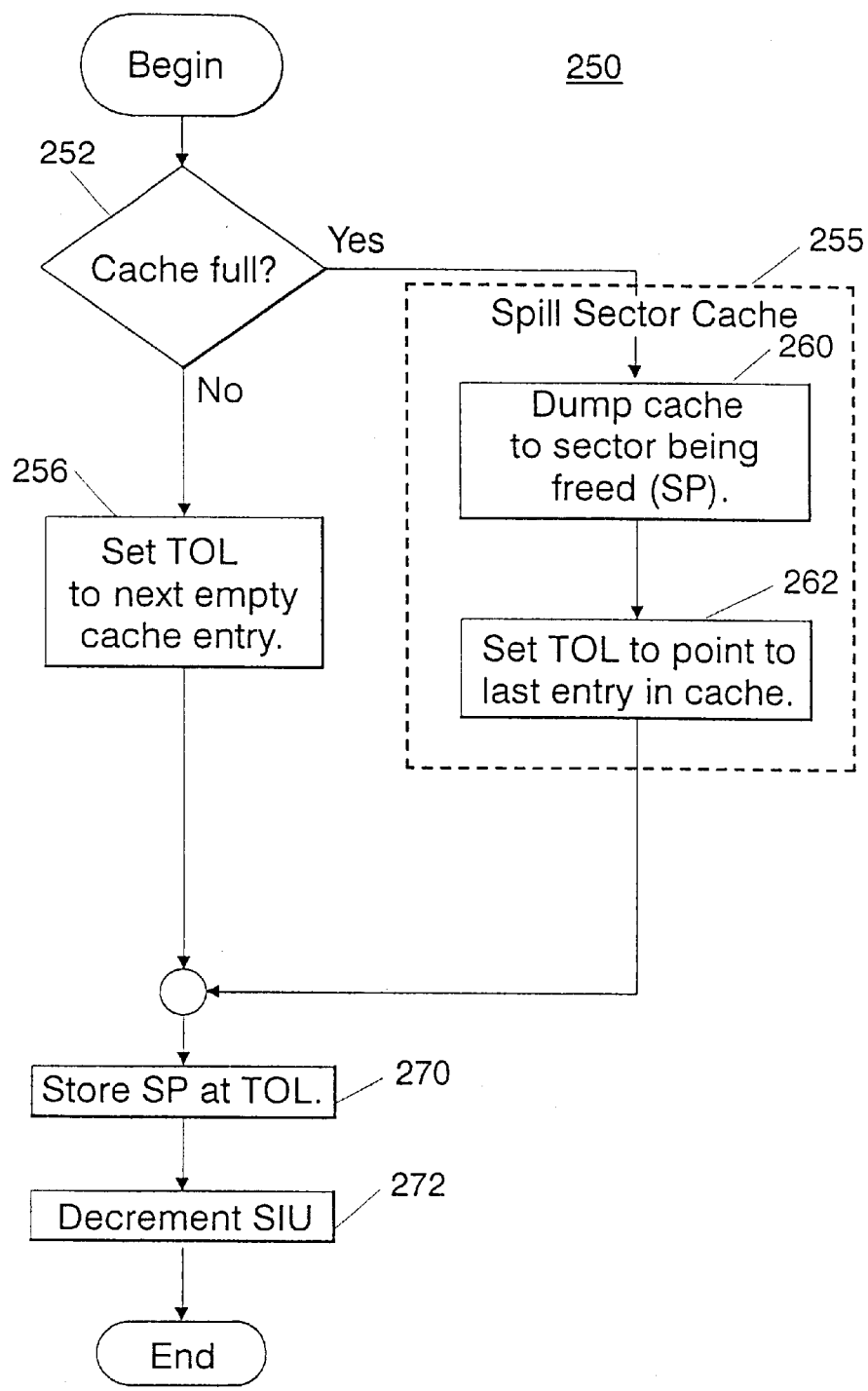
FIG. 4(b) illustrates a free sector de-allocation process 250.

In FIG. 4(b) depicts a sector de-allocation process 250 whereby sectors are deallocated from a real memory block and placed back 64 on the free list. Initially, the pointers to these sectors are cached in the memory controller. Thus, at step 252, a decision is made as to whether the cache is full. If the current cache is not full, then the TOL is set to the next empty cache entry, as illustrated at step 256, and the process continues to step 270 where the SP is stored at the TOL. Then, at step 272, the SIU register is decremented. Otherwise, at step 252, if the current cache is full, a spill sector cache mechanism 255 is employed whereby the current cache contents are spilled to one of the sectors on the free list. Specifically, this mechanism comprises a first step 260 which involves transferring the cache contents to the sector being freed (SP), and, at step 262, setting the TOL to point to the last entry in the cache. That is, the pointer to this sector is kept in the cache as the link for the linked list. Continuing on to step 270, the SP is stores at the TOL and, at step 272, the SIU register is decremented.

Figure 5:
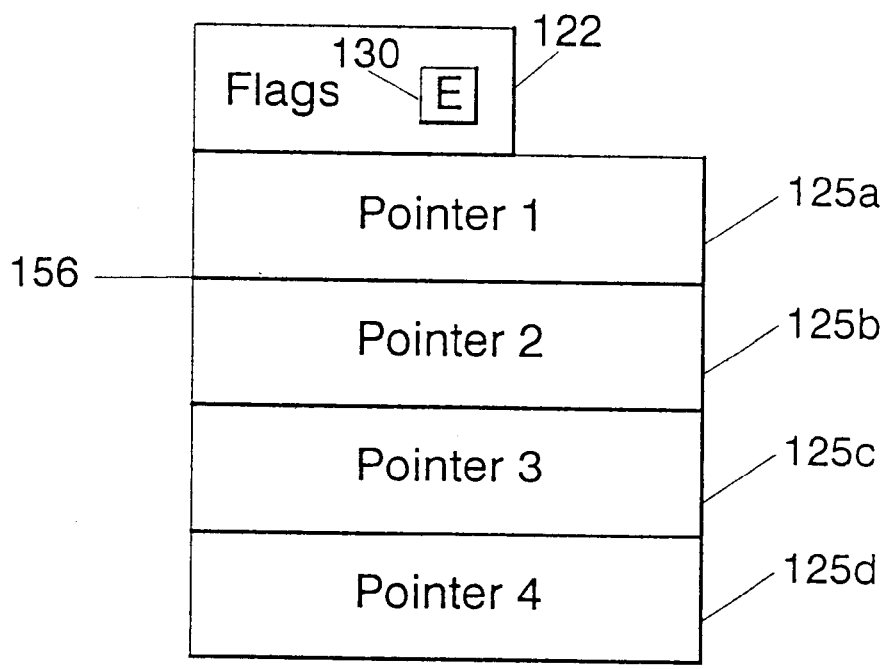
FIG. 5 is a schematic representation of a CTT entry in the CTT table included in the physical memory.

As mentioned with respect to FIG. 1, a large portion of physical memory is simply divided up into sectors which can be used to store the data associated with a real memory block. In the preferred embodiment the sector size is chosen as 256 bytes. Thus, for example, four sectors are required to store all the data associated with a real memory block (1024 bytes). As mentioned, fields in the TT entry for a real address indicate the location and size of the physical memory which is assigned to store the data of the real memory block. Preferably, each TT entry is associated with a 1024 byte real memory block and will hold pointers for up to four sectors assigned to the real memory block. FIG. 5 is a schematic representation of a TT entry 156. As shown in FIG. 5, each TT entry 156 comprises a set of flag is bits 122, and four (4) spaces 125a, . . . , 125d for storing respective sector pointers. One of the flag bits, bit E 130, designates that the associated real memory block is empty and that there are no sectors assigned to that block, i.e., the pointers fields 125a, . . . , 125d are empty. Another field comprising one or more bits C 131 designates the class id that the real memory block is associated with. It should be understood that, as part of an initialization routine, a mechanism is provided such that there is no physical memory block associated with the index, i.e., E field, and, further that the C bit field 131 is inititialized to a default value. As will be described in further detail with respect to FIG. 8, when a page reference and a class are written to the CCR 197, the 'C' field of the TT entries for that page are updated to the new value and the 'cSIU' registers of the old and new classes are updated to reflect the change.

Figure 8:
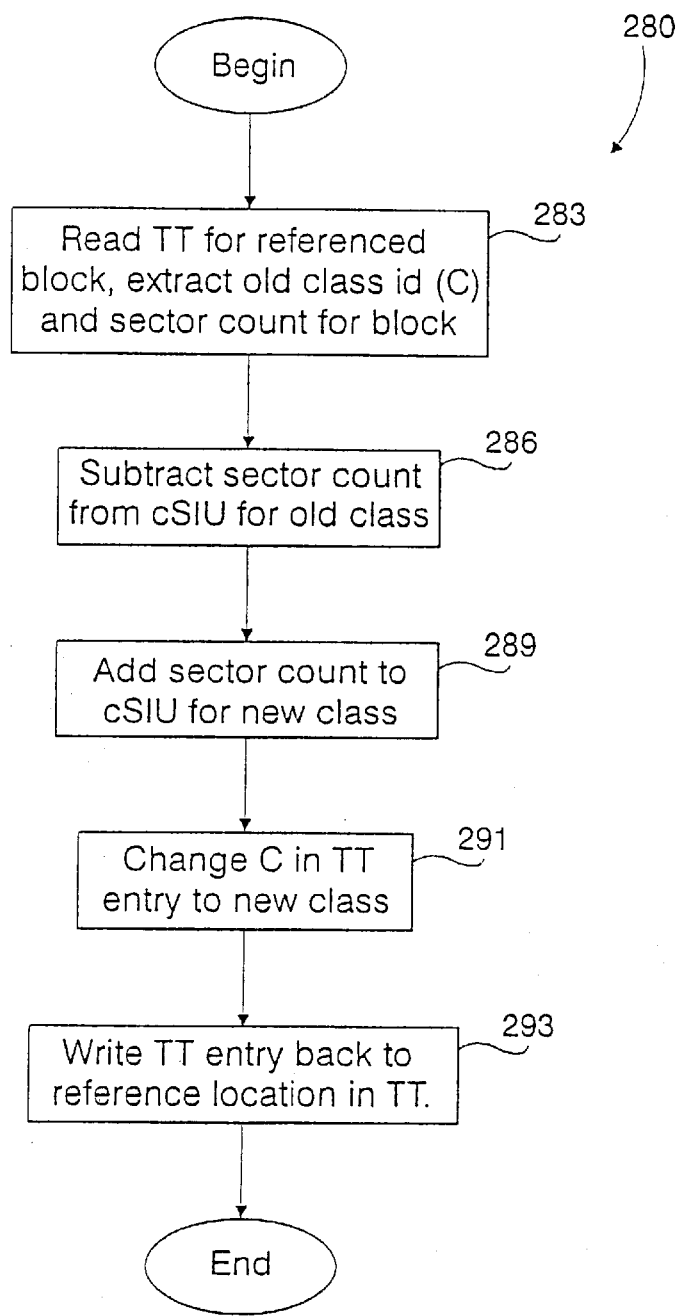
FIG. 8 is a flow diagram depicting the mechanism for updating the TT entries and cSIU registers when the CCR 197 is written with page and associated class information.

FIG. 8 is a flow diagram depicting the mechanism 280 for updating the TT entries 156 and cSIU's when the CCR 197 is written with page and associated class information. As shown in FIG. 8, at step 283, there is performed a first step of reading the translation table entry 156 for the referenced block, and, extracting the old class id (C) and the sector count for the block. Then, as indicated at step 286, there is performed the step of subtracting the sector count from the associated cSIU register 192 (FIG. 1) for that old class C. Then, at step 289, the sector count is updated (added) to the cSIU for the new class written into the register. The corresponding entry 156 in the TT 155 is additionally updated with the new class designation at step 291, and the TT entry 156 is written back to the reference location in the TT 155 at step 293.

As the actual usage of the physical memory varies with the number of real memory blocks which have physical memory allocated to them, the computer system 100 continuously monitors the amount of physical memory in use at each instant in time. If the usage of physical memory becomes too great, the system may exhaust the available physical memory. Preferably, when physical memory usage reaches a predetermined level the system software is notified so that it can reduce the usage of physical memory. As mentioned, two registers are maintained in the memory controller to monitor the physical memory usage: the Sectors In Use (SIU) register 190 (FIG. 1) which includes a current count of the total number of sectors which are allocated to real memory pages; and, the threshold register TR (FIG. 1) 195 which holds a number representing the maximum amount of physical memory which should be allocated to real memory blocks. The management of the SIU register is described in greater detail herein with respect to FIG. 4(*a*). Briefly, in operation, the SIU is continuously compared against the TR and when the SIU becomes greater than the TR an interrupt 191 is sent to the processor to alert the system software that physical memory usage has become high. In response to this interrupt the system software will reduce memory usage through a well known mechanism such as paging and zero those real memory blocks freed up as a result of this process. The system software continues freeing up real and physical memory until the SIU reaches some value less than TR. The SIU and the TR may be read by the processor, however, only the TR may be written by the processor.

According to the invention, three operations are defined for dynamically allocating physical memory: 1) write data to a real address; 2) read data from a real address; and, 3) empty real block referenced by a real address.

Figure 6A:
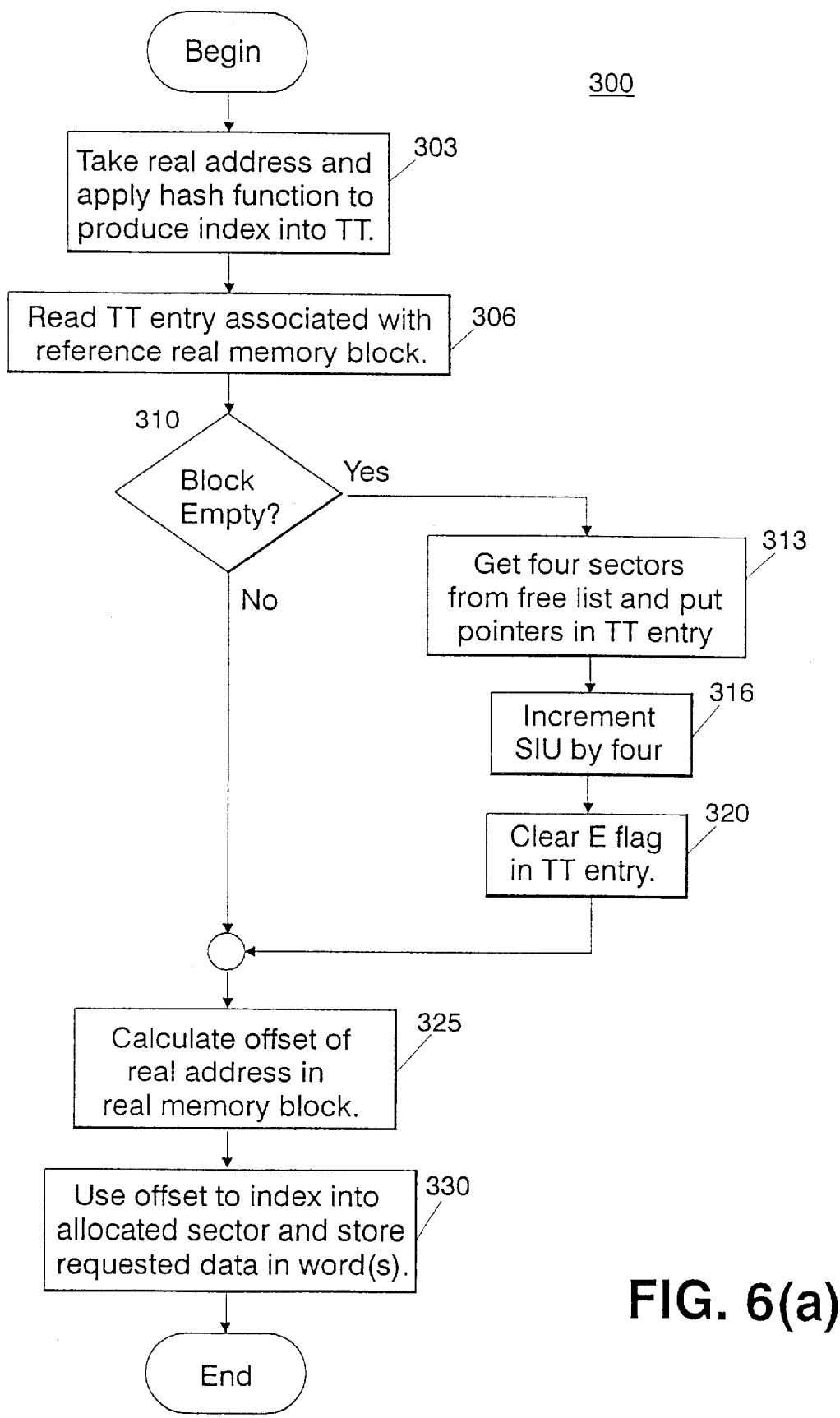
FIG. 6(a) illustrates the process for writing data into a real address according to the principles of the invention.
Figure 6B:
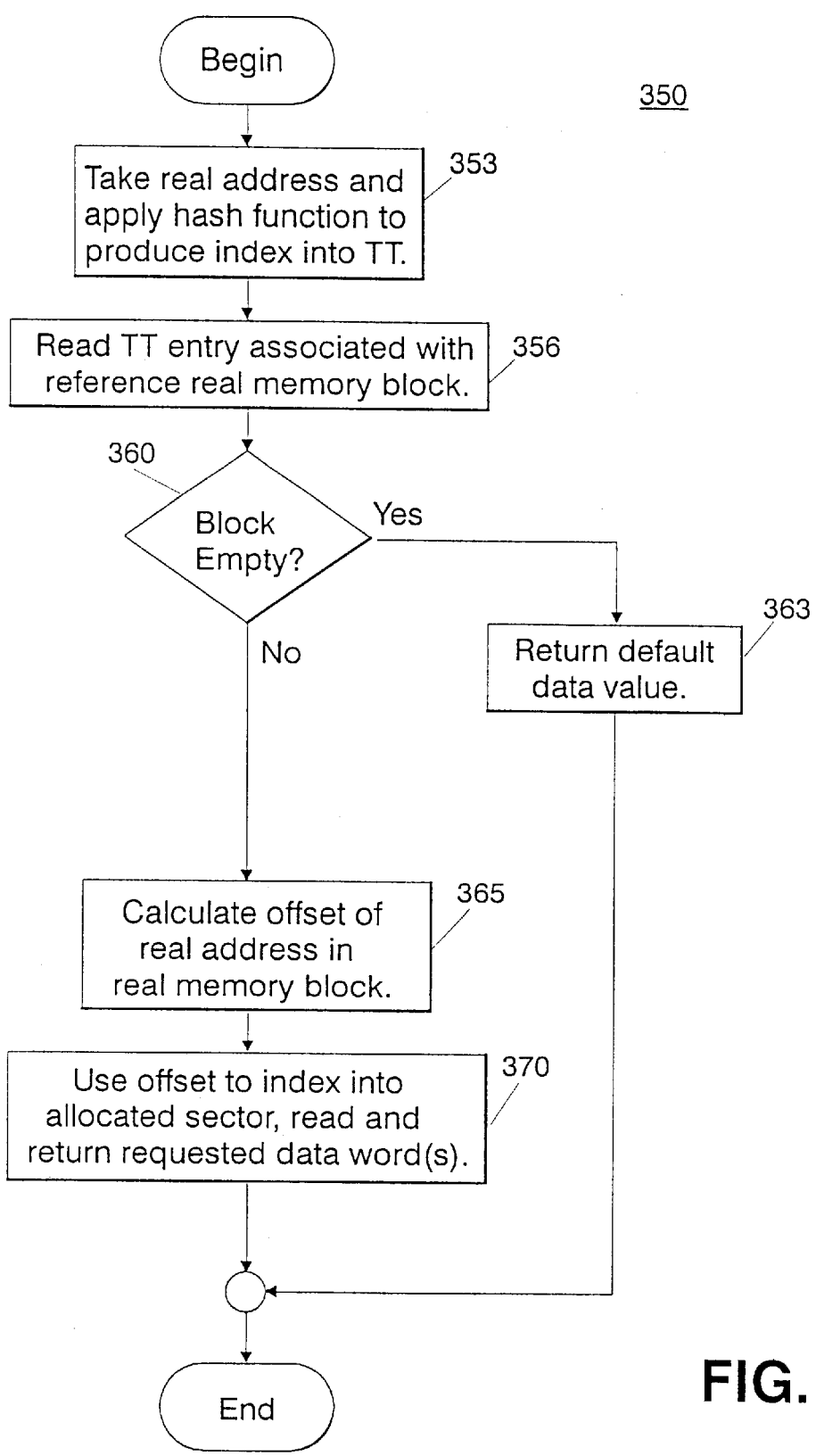
FIG. 6(b) illustrates the process for reading data from a real address according to the principles of the invention.
Figure 6C:
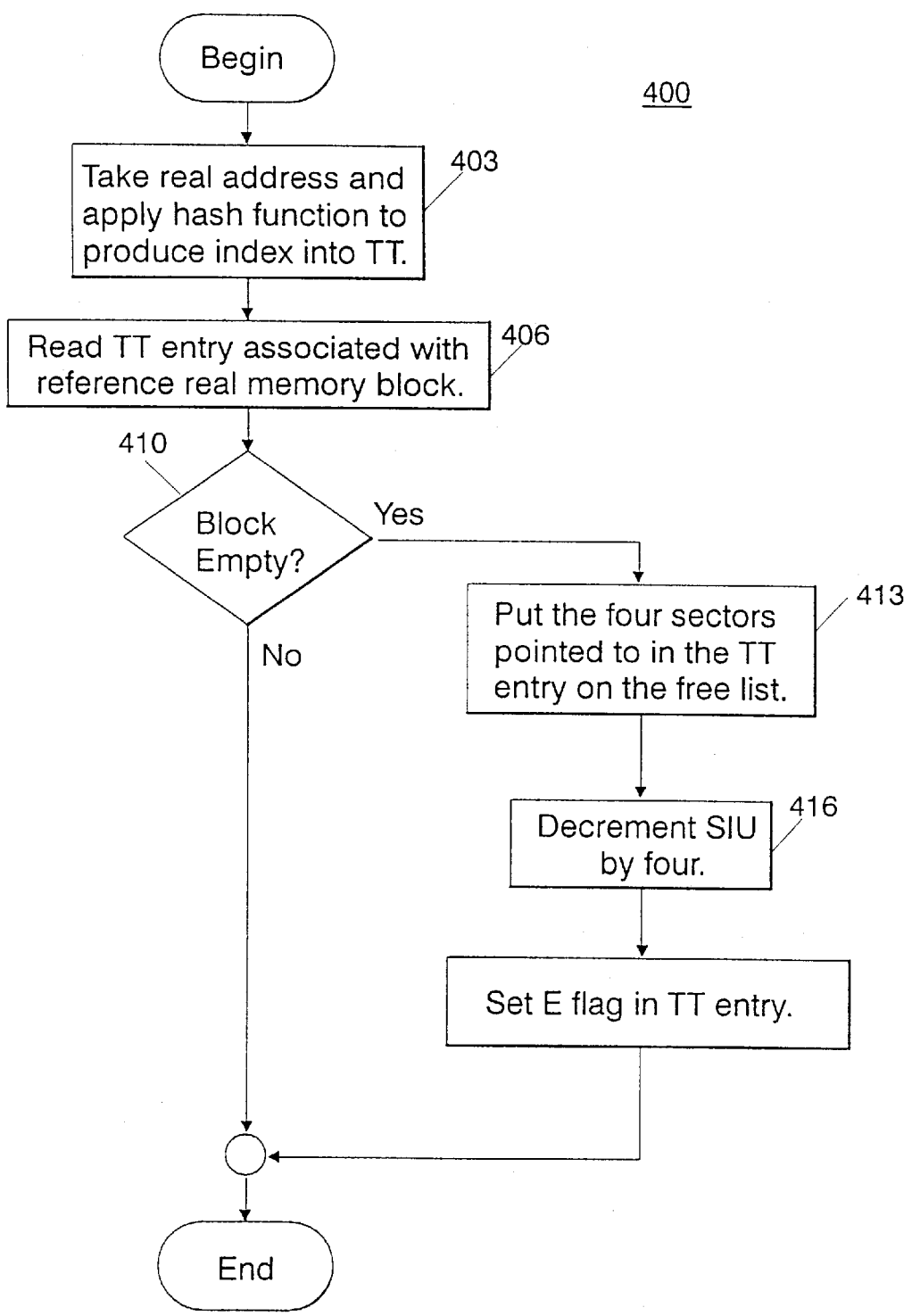
FIG. 6(c) illustrates the process for deallocating the physical memory sectors that are no longer needed according to the principles of the invention.

The process for writing data into a real address is described in accordance with FIG. 6(*a*). As shown in FIG. 6(*a*), the process 300 for writing data into a real address includes a first step 303 of applying a hash function to a CPU generated real address for determining an index into the TT table 155. Then, at step 306, the TT entry associated with the referenced real memory block is read. Furthermore, at step 306, the associated cSIU register is located as referenced by the C flag in the TT entry. At step 310, a determination is made as to whether the block is empty, i.e., whether the E bit flag 130 indicating no physical memory allocated to the real memory block. If the block is empty, then at step 313, four sectors are obtained from the free list 165 and corresponding pointers 125*a*, ..., 125*d* are placed in the TT entry. The SIU register 190 and cSIU register 197 in the memory controller are then each incremented by four (4) at step 316 and the E bit flag 130 is cleared in the TT entry at step 320. After step 320, or if, at step 310, it is determined that the block is not empty, the process continues to step 325 where an offset of the real address in the real memory block is calculated. Then, at step 330, the calculated offset is used as an index into allocated sector and the requested data is stored in word(s). Thus, from the write data process depicted in FIG. 6(*a*), it is understood that if the block is marked as empty, i.e., there is no physical memory allocated to the block, sectors are assigned to the block before the write is performed. Otherwise, the write is performed to the appropriate word(s) in one of the sectors assigned to the block.

FIG. 9 is a flow chart depicting the continuous running SIU and cSIU monitoring process 450. As illustrated in FIG. 9, the continuous running process implements a step 453 wherein the current count maintained by the SIU is compared to the TR(s). If the current count maintained by the SIU is larger than the count maintained in the TR, then the CPU is interrupted at step 455. Likewise, at step 458 the current count maintained by each of the cSIU's are compared to their associated cTR(s). If any of these comparisons indicate a cSIU count greater than the associated cTR, then the CPU will be interrupted at step 460.

The process for reading data from a real address is described in accordance with FIG. 6(*b*). As shown in FIG. 6(*b*), the process 350 for reading data from a real address includes a first step 353 of applying a hash function to a CPU generated real address for determining an index into the TT table 155. Then, at step 356, the TT entry associated with the referenced real memory block is read. At step 360, a determination is made as to whether the block is empty, i.e., whether the E bit flag 130 indicating no physical memory allocated to the real memory block. If the block is empty, then at step 363, a default data value is returned and the process terminates. If, at step 360, it is determined that the block is not empty, then the process continues to step 365 where an offset of the real address in the real memory block is calculated. Then, at step 370, the calculated offset is used as an index into allocated sector and the requested data word(s) is read and returned. Thus, from the read data process depicted in FIG. 6(*b*), it is understood that the data is retrieved from the appropriate place in one of the sectors assigned to the block unless the block is empty. If the block is empty a default value is returned for the read. Note that a read of an empty block could optionally signal a memory access fault to the CPU.

When a real memory block is no longer needed, the operating system may deallocate the physical memory sectors associated with that real memory block by issuance of an "empty real block command" from the processor. The process for deallocating the physical memory sectors that are no longer needed is described in accordance with FIG. 6(*c*). As shown in FIG. 6(*c*), the process 400 for deallocating the physical memory sectors includes a first step 403 of applying a hash function to a CPU generated real address for determining an index into the TT table 155. Then, at step 406, the TT entry associated with the referenced real memory block is read. Furthermore, at step 406, the associated cSIU register is located as referenced by the C flag in the TT entry. At step 410, a determination is made as to whether the block is empty indicating no physical memory allocated to the real memory block. If the block is empty, then the process terminates. Otherwise, if it is determined that the block is not empty, then at step 413, the four sectors pointed to by the corresponding TT entry are added to the free list 165. The SIU register 190 and the cSIU register 197 in the memory controller are then each decremented by four (4) at step 416 and the E bit flag 130 is set in the TT entry at step 420. After step 420, the process terminates. Thus, the deallocating physical memory sectors process depicted in FIG. 6(*c*) enables conservation of physical memory by returning the physical memory sectors to the free list for reuse with other real memory blocks.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computing system having a processor device for generating real addresses associated with memory locations of a real memory system for reading and writing of data thereto, said system comprising:

a plurality of memory blocks in said real memory system for storing said data, a physical memory storage for storing the data of the real memory blocks, each said real memory block partitioned into one or more sectors, each comprising contiguous bytes of said physical memory;

an index table structure in said physical memory storage having entries for associating a real address with zero or more sectors of said physical memory, each index table entry including one or more pointers for pointing to a corresponding sector in its associated real memory block, said table accessed for storing data in one or more allocated sectors for memory read and write operations initiated by said processor;

a control device associated with said physical memory for dynamically allocating sectors in a memory block and further calculating an offset of said real address in said memory block for indexing into an allocated sector for data read and data write operations thereto, said control device implementing a free list structure having address pointers for pointing to unallocated sectors to be allocated and maintaining a top entry pointer for pointing to a sector address corresponding to a next sector in said list to be allocated; and, a cache memory comprising a portion of said free list structure and including a first entry corresponding to a sector address pointed to by said top entry pointer and a last entry, wherein, upon determination that a sector corresponding to said last entry stored in said cache has been allocated, said control device filling said cache memory by loading contents of new unallocated sector address pointers into said cache, and setting said top entry pointer to a first entry in said cache.

2. The computing system as claimed in claim 1, further comprising a tracking mechanism for determining existence of unallocated sectors in said physical memory as a result of system operations, and updating said free list structure with address pointers to determined unallocated sectors.

3. The computing system as claimed in claim 2, wherein, upon determination that a cache is full and new sectors are to be added to said list structure as a result of sector deallocation, said control device further spills said cache memory said device transferring contents to a sector being freed, and setting said top entry pointer to a last entry in said cache memory.

4. The computing system as claimed in claim 3, wherein said control device further calculates said offset into said allocated sector based on said top entry pointer.

5. The computing system as claimed in claim 4, wherein said list structure comprises a linked list of sectors, each said sector of said linked list comprising pointers to addresses of unallocated sectors in said physical memory.

6. The computing system as claimed in claim 1, wherein said control device for dynamically allocating further comprises:

a mechanism for determining if a memory block comprises unallocated sectors prior to a memory write operation; and, a mechanism for retrieving corresponding pointers from said list structure associated with sectors to be allocated and placing said pointers into an entry in said index table corresponding to an empty memory block prior to a memory write operation.

7. The computing system as claimed in claim 6, wherein each entry of index table includes a flag for indicating no current memory sectors being allocated for a particular index, said mechanism for determining if said memory block comprises unallocated sectors checking said flag prior to a memory write operation.

8. The computing system as claimed in claim 1, wherein said control device further comprises:

a mechanism for counting a total number of sectors which have been allocated to memory blocks; and, a comparator mechanism for comparing said number of sectors allocated against a predetermined threshold and generating a system interrupt signal when said count is greater than said threshold.

9. The computing system as claimed in claim 8, wherein said control device further includes mechanism for incrementing said count when sectors from said list are assigned to said index table entry, and decrementing said count when unallocated sector pointers are added to said list structure.

10. The computing system as claimed in claim 8, wherein said memory blocks are allocated into classes, said counting mechanism further comprising:

mechanism associated with each class for counting a number of sectors which have been allocated to respective memory block classes; and, a comparator mechanism for comparing a count of the number of sectors allocated for each class against a predetermined threshold associated for that class, and generating a system interrupt signal when a count for a count of allocated sectors for a class is greater than its respective threshold.

11. The computing system as claimed in claim 10, wherein said control device further includes mechanism for incrementing said count when sectors from said list are assigned to a memory block class of a respective index table entry, and decrementing said count when unallocated sector pointers are added to said list structure.

12. The computing system as claimed in claim 10, wherein said control device includes a class control register which may be written with an address of a memory page and the class data which is to be assigned to the page.

13. The computing system as claimed in claim 10, wherein each entry of index table includes a flag for indicating the class for memory sectors that are allocated for a particular index, said control device further updating said class flag when a memory block receives allocated sectors for a new class and extracting said class flag when sectors are deallocated from said memory block.

14. The computing system as claimed in claim 1, wherein said control device applies a hash function to a processor generated real memory address to provide an index into said index table for accessing said associated memory block.

15. A method for dynamically allocating memory blocks in a computer system comprising a real system memory, said computer system including a processor device for generating real addresses associated with memory locations of said real memory system for reading and writing data thereto, said method comprising:

a) providing a physical memory storage for storing the data of the real memory blocks, each said real memory block partitioned into one or more sectors, each comprising contiguous bytes of said physical memory;

b) maintaining a free list structure including address pointers for pointing to unallocated sectors to be allocated to real memory blocks for a processor request;

c) maintaining a portion of said free list structure in a cache memory, said cache memory including first and last entries with said first entry corresponding to a sector address pointed to by a top entry pointer associated with a next sector to be allocated;

d) for a processor request, addressing an index table structure having entries for associating a real address with a memory block of said physical memory that holds associated processor data in one or more sectors allocated for said block and, calculating offset of real address in said memory block and utilizing said offset to index into an allocated sector of said memory block for respectively reading or writing data thereto; and, if no sectors are allocated, e) dynamically allocating sectors in a memory block by retrieving corresponding pointers from said list structure utilizing said top entry pointer, and, wherein, upon determination that a sector corresponding to a last entry stored in said cache has been allocated, the steps of filling said cache memory by loading contents of new unallocated sector address pointers into said cache, and setting said top entry pointer to a first entry in said cache.

16. The method as claimed in claim 15, further including the steps of:

determining existence of unallocated sectors in said physical memory as a result of system operations; and updating said free list structure with address pointers to determined unallocated sectors.

17. The method as claimed in claim 16, further including the steps of:

spilling said cache upon determination that a cache is full and new sectors are to be added to said list structure as a result of sector deallocation;

transferring contents to a sector being freed; and, setting said top entry pointer to a last entry in said cache memory.

18. The method as claimed in claim 15, wherein said step d) of calculating said offset is based on said top entry pointer.

19. The method as claimed in claim 15, wherein said dynamic allocating step e) for a processor write request further includes the steps of:

determining if said physical memory allocated to said block is empty; and, if said addressed memory block is empty, placing said pointers into an entry for said block in said index table prior to said memory write operation.

20. The method as claimed in claim 19, wherein said step of determining empty memory block includes the step of detecting a flag associated with the addressed entry of said an index table structure for indicating no current physical memory blocks being associated with a particular index.

21. The method as claimed in claim 19, further including the steps of:

tracking a number of sectors which have been allocated to real memory blocks by said memory system; and, incrementing said count when sectors from said list are assigned to said index table entry.

22. The method as claimed in claim 21, further including the step of:

comparing said number of sectors allocated with a predetermined threshold; and generating an system interrupt signal when said count is greater than said threshold.

23. The method as claimed in claim 19, wherein said memory blocks are allocated into classes, said method further including the steps of:

counting a number of sectors which have been allocated to respective memory block classes;

comparing a count of the number of sectors allocated for each class against a predetermined threshold associated for that class; and, generating a system interrupt signal when a count of allocated sectors for a class is greater than its respective threshold.

24. The method as claimed in claim 23, further including the steps of:

incrementing said count when sectors from said list are assigned to a memory block class of a respective index table entry; and, decrementing said count when unallocated sector pointers are added to said list structure.

25. The method as claimed in claim 23, wherein each entry of index table includes a flag for indicating the class for memory sectors that are allocated for a particular index, said method further including the steps of:

updating said class flag when a memory block receives allocated sectors for a new class; and, extracting said class flag when sectors are deallocated from said memory block.

26. The method as claimed in claim 15, wherein said step of addressing an index table structure includes the step of applying a hash function to a processor generated real memory address to provide said index into said index table to get an associated physical memory address.

* * * * *